(12) United States Patent
Cavallaro et al.

(10) Patent No.: US 9,924,464 B2
(45) Date of Patent: Mar. 20, 2018

(54) IDENTIFYING AT LEAST ONE ALTERNATE POWER SOURCE FOR PROVIDING POWER TO A PORTABLE ELECTRONIC DEVICE

(71) Applicant: MOTOROLA MOBILITY LLC, Chicago, IL (US)

(72) Inventors: Alberto Cavallaro, Northbrook, IL (US); Amit Kumar Agrawal, Bangalore (IN); David Winkler, Aurora, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/221,322

(22) Filed: Jul. 27, 2016

(65) Prior Publication Data

US 2018/0035383 A1 Feb. 1, 2018

(51) Int. Cl.
*G06F 1/26* (2006.01)
*H04W 52/02* (2009.01)
*H04W 4/02* (2018.01)
*H04W 68/00* (2009.01)

(52) U.S. Cl.
CPC ....... *H04W 52/0261* (2013.01); *H04W 4/021* (2013.01); *H04W 52/0251* (2013.01); *H04W 68/005* (2013.01)

(58) Field of Classification Search
CPC ...... G06F 1/3206; G06F 1/3203; G06F 1/263; H01M 2/0202; H01M 2/022
See application file for complete search history.

(56) References Cited

U.S. PATENT DOCUMENTS

| | | | | |
|---|---|---|---|---|
| 8,688,517 | B2 * | 4/2014 | Lutnick | G06Q 30/02 705/14.1 |
| 8,793,520 | B2 * | 7/2014 | Ingrassia, Jr. | G06F 1/3206 455/573 |
| 8,805,764 | B1 * | 8/2014 | Rhines | G06N 5/02 706/46 |
| 8,958,854 | B1 * | 2/2015 | Morley | H04M 1/72563 370/311 |
| 9,693,311 | B2 * | 6/2017 | Cardozo | H04W 52/0258 |
| 2005/0248313 | A1 * | 11/2005 | Thorland | H02J 7/0075 320/130 |
| 2007/0188145 | A1 * | 8/2007 | Kim | G01R 31/3682 320/132 |

(Continued)

*Primary Examiner* — Bobbak Safaipour
(74) *Attorney, Agent, or Firm* — Yudell Isidore PLLC

(57) ABSTRACT

A method, system, and computer program product for identifying at least one alternate power source to provide power to a portable device during an upcoming time period of use. The method includes monitoring power parameters associated with at least one battery of the portable device and determining, based on the power parameters, whether the at least one battery that is currently coupled to the portable device is capable of powering the portable device for an entirety of an upcoming time period of use. In response to determining the at least one battery is not capable of powering the portable device for the entirety of the upcoming time period of use, identifying at least one alternate power source that may provide power for use during the upcoming time period of use. The method then includes generating and outputting a power management strategy, which utilizes the at least one alternate power source.

18 Claims, 6 Drawing Sheets

(56) References Cited

U.S. PATENT DOCUMENTS

| | | | |
|---|---|---|---|
| 2009/0163247 A1* | 6/2009 | Song | H04M 1/0235 |
| | | | 455/566 |
| 2010/0151918 A1* | 6/2010 | Annambhotla | G01R 31/3648 |
| | | | 455/573 |
| 2011/0009172 A1* | 1/2011 | Song | H04M 1/72544 |
| | | | 455/573 |
| 2011/0071780 A1* | 3/2011 | Tarkoma | G01R 31/3679 |
| | | | 702/63 |
| 2011/0199041 A1* | 8/2011 | Yang | H01M 10/46 |
| | | | 320/101 |
| 2012/0254634 A1* | 10/2012 | Chakra | G06F 1/28 |
| | | | 713/300 |
| 2014/0176046 A1* | 6/2014 | Park | H02J 7/0024 |
| | | | 320/103 |
| 2014/0379285 A1* | 12/2014 | Dempsey | G01R 31/3689 |
| | | | 702/63 |
| 2016/0149420 A1* | 5/2016 | Sasaki | B60L 11/1859 |
| | | | 320/134 |
| 2016/0187429 A1* | 6/2016 | Kawai | G01R 31/3651 |
| | | | 702/63 |
| 2016/0242119 A1* | 8/2016 | Shedletsky | H04W 52/0258 |
| 2017/0176539 A1* | 6/2017 | Younger | G01R 31/3651 |
| 2017/0187210 A1* | 6/2017 | Cogill | H02J 7/0044 |

* cited by examiner

IDENTIFYING AT LEAST ONE ALTERNATE POWER SOURCE FOR PROVIDING POWER TO A PORTABLE ELECTRONIC DEVICE

BACKGROUND

1. Technical Field

The present disclosure generally relates to electronic devices and in particular to identifying at least one alternate power source for a portable device.

2. Description of the Related Art

Portable devices have become ubiquitous in everyday life in both personal and business usage. However, portable devices have a finite battery life when disconnected from a power charger/charging station. When a battery of a portable device has completely depleted, the depleted battery can cause a user of the portable device to be without access to desirable and/or critical personal and/or business applications/resources. While batteries of many portable devices are capable of being recharged and/or replaced, it may be difficult for a user to determine, from a single battery indicator such as a percentage of battery life remaining, an exact amount of practical usage/battery life that remains in a current battery and whether the battery will be depleted while a user is away from a power charger/charging station. Even for devices that are constructed to accept a replacement battery, if the replacement battery is swapped into the portable device too early, the replacement battery may also be depleted at an undesirable time, such as while a user of the portable device does not have access to a battery charger to charge the primary battery or the replacement battery.

BRIEF DESCRIPTION OF THE DRAWINGS

The description of the illustrative embodiments is to be read in conjunction with the accompanying drawings, wherein.

DETAILED DESCRIPTION

Figure 1:
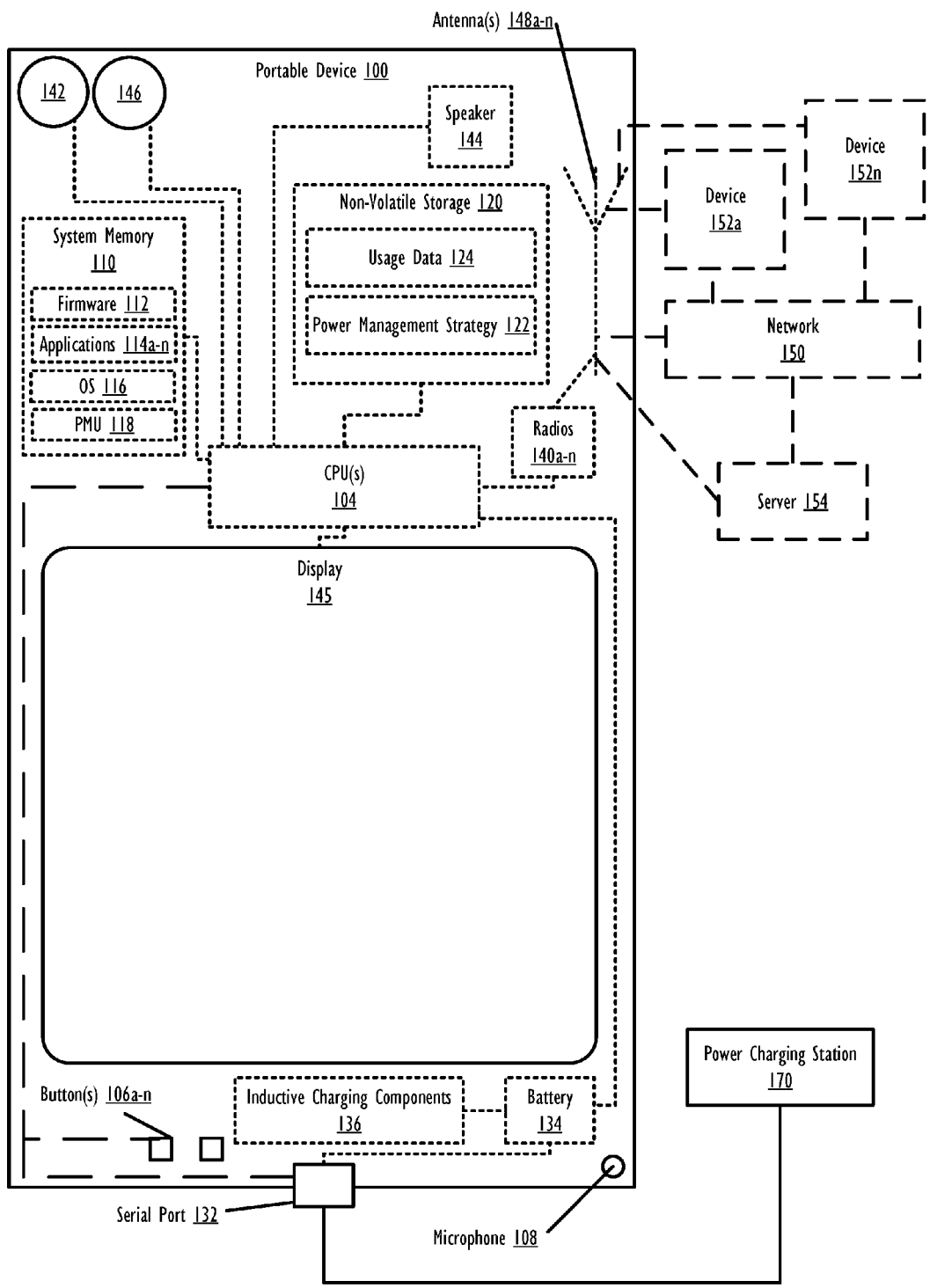
FIG. 1 provides a block diagram representation of a portable device within which certain aspects of the disclosure can be practiced, in accordance with one or more embodiments.

The illustrative embodiments provide a method, system, and computer program product for identifying at least one alternate power source for a portable device. The method includes monitoring power parameters associated with at least one battery. The method further includes determining, based on the power parameters, whether the at least one battery that is currently coupled to the portable device is capable of powering the portable device for an entirety of an upcoming time period of use during which the portable device will not have access to an alternate power source, such as a charging station and/or replacement battery. In response to determining the at least one battery is not capable of powering the portable device for the entirety of the upcoming time period of use, identifying at least one alternate power source that may deliver power to the portable device for use during the upcoming time period of use. The method then includes generating and outputting a power management strategy, which utilizes the at least one alternate power source for the portable device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within portable device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example portable device 100 within which one or more of the described features of the various embodiments of the disclosure can be implemented. In one embodiment, portable device 100 can be any portable device that includes at least one battery, such as, but not limited to, a notebook computer, mobile phone, portable battery pack, smart watch, digital camera, video recorder, or tablet computer. Portable device 100 includes at least one processor or central processing unit (CPU) 104. CPU 104 is coupled to system memory 110, within which firmware 112, operating system (OS) 116, power management utility (PMU) 118, and applications 114a-n can be stored for execution on CPU 104. According to one aspect, PMU 118 executes within portable device 100 to perform the various methods and functions described herein. In one or more embodiments, PMU 118 generates power management strategy 122, which identifies at least one alternate source of power for a portable device 100. For simplicity, PMU 118 is illustrated and described as a stand-alone or separate software/firmware/logic component, which provides the specific functions and methods described below. However, in at least one embodiment, PMU 118 may be a component of, may be combined with, or may be incorporated within firmware 112, or OS 116 and/or within one or more of applications 114a-n. CPU 104 is also coupled to non-volatile storage 120, which may include usage data 124 and may also be used to store power management strategy 122.

As shown, portable device 100 may include input devices and output devices that enable a user to interface with portable device 100. In the illustrated embodiment, portable device 100 includes camera sensor 142, camera flash 146, display 145, hardware buttons 106a-n, microphone 108, and speaker 144. Hardware buttons 106a-n are selectable buttons which are used to receive manual/tactile input from a user to control specific operations of portable device 100 and/or of applications executing thereon. In one embodiment, hardware buttons 106a-n may also include or may be connected to one or more sensors (e.g. a fingerprint scanner) and/or be pressure sensitive. Hardware buttons 106a-n may also be directly associated with one or more functions of a graphical user interface (not pictured) and/or functions of an OS, application, or hardware of portable device 100. In one embodiment, hardware buttons 106a-n may include a keyboard.

Portable device 100 also includes display 145, which is capable of displaying text, media content, and/or a graphical user interface (GUI) of firmware and/or one or more applications executing on portable device 100. The GUI can be rendered by CPU 104 for viewing on display 145 or be rendered by a graphics processing unit (GPU), in one embodiment. In one embodiment, display 145 is a touch screen that is also capable of receiving touch input from a user of portable device 100 who is interfacing with a displayed GUI. In at least one embodiment, portable device 100 can include a plurality of virtual buttons or affordances that operate in addition to, or in lieu of, hardware buttons 106a-n. For example, portable device 100 can be equipped with a touch screen interface and provide, via a GUI, a virtual keyboard or other virtual icons for user interfacing therewith.

Portable device 100 also includes battery 134 and serial port 132 (e.g., a USB (universal serial bus) port) which can operate as one of an input port, an output port, and a combination input/output port. In one application, serial port 132 allows a direct physical connection to and communication of data with a second device. In one embodiment, a separate, external power charging station 170 may connect to portable device 100 via serial port 132 for charging battery 134. Power charging station 170 may be connected to any permanent power supply, such as an alternating current power supply outlet in a business or residence. In one embodiment, portable device 100 may also include inductive charging components 136 for wireless (inductive) charging of battery 134. Battery 134 include may include a single battery or multiple batteries for providing power to components of portable device 100 while portable device 100 is disconnected from power charging station 170. In one embodiment, battery 134 may include at least one battery that is removable and/or replaceable by an end user and/or at least one battery that is permanently secured to portable device 100.

Portable device 100 also includes one or more wireless radios 140a-n and can include one or more antenna(s) 148a-n that enable portable device 100 to wirelessly connect to, and transmit and receive voice communication and/or data with, one or more other devices, such as devices 152a-n and server 154. As a wireless device, portable device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, portable device 100 may be further equipped with an infrared (IR) device (not pictured) for communicating with other devices using an IR connection. In another embodiment, wireless radios 140*a-n* may include a short-range wireless device, including, but not limited to, a near field communication (NFC) device. In still another embodiment, portable device 100 may communicate with one or more other device(s) using a wired or wireless USB connection. In one or more embodiments, devices 152*a-n* may include one or more charging stations (not shown) and/or replacement batteries (not shown).

Figure 2:
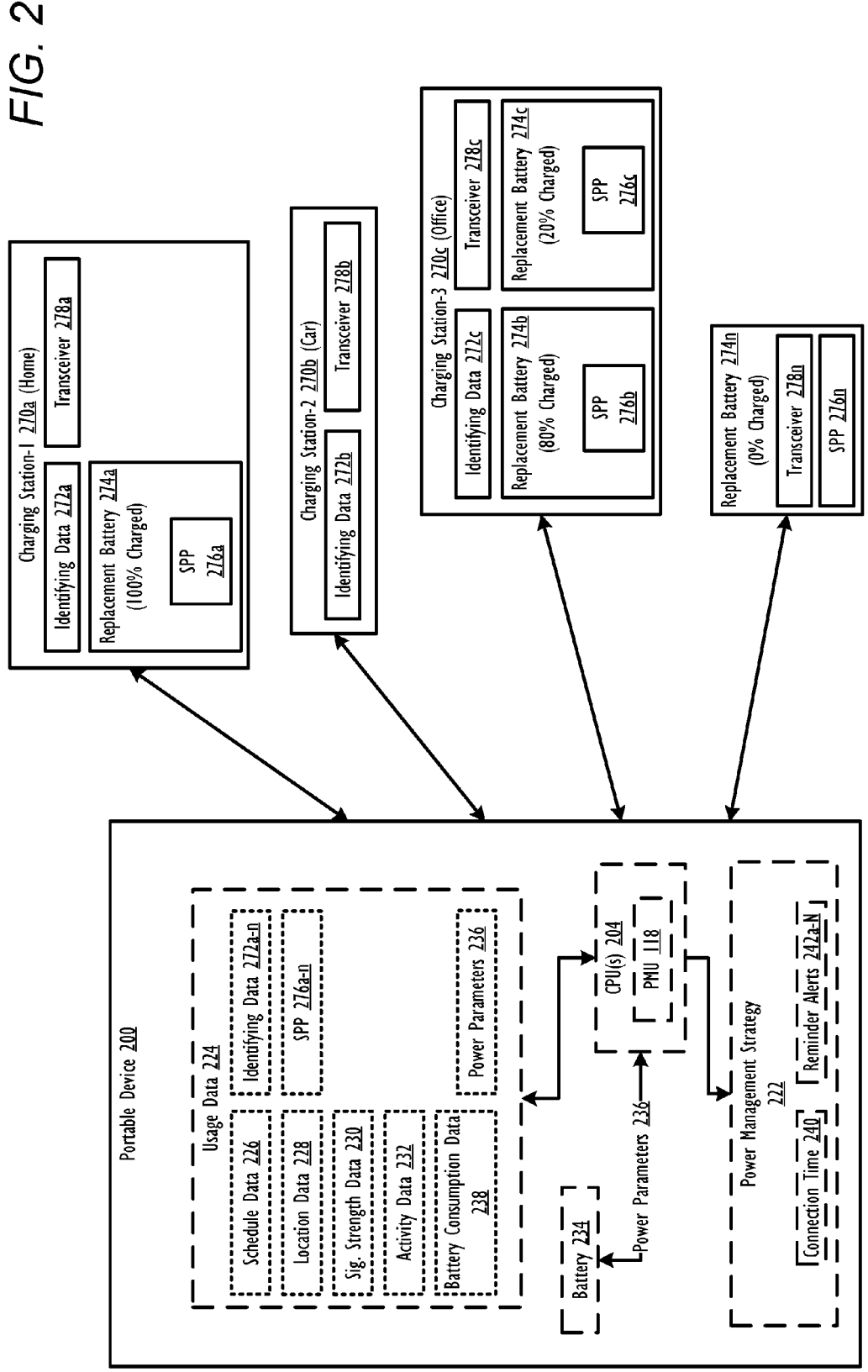
FIG. 2 illustrates a portable device which generates a power management strategy that identifies at least one alternate power source to provide power to the portable device, in accordance with one or more embodiments.

FIG. 2 is a block diagram illustrating a portable device which generates a power management strategy that identifies at least one alternate power source to provide power to the portable device during a future period of use, in accordance with one or more embodiments. It should be noted that portable device 200 may be configured as portable device 100 or another electronic device that includes the hardware and software components to execute PMU 118. For consistency in the description thereof, portable device 200 is assumed to be similar to portable device 100 and include similar components. Portable device 200 includes CPU(s) 204 (which executes PMU 118), battery 234, and system memory (e.g., system memory 110) or non-volatile storage (e.g., non-volatile storage 120) within which usage data 224 of portable device 200 is stored. It should be noted that battery 234 may include a single battery or multiple batteries, each of which may be either permanently attached to portable device 200 or may be user-replaceable/swappable. In one embodiment, each of the multiple batteries may have a different charge capacity (e.g., different milliamp-hour (mAh) ratings). In another embodiment, battery 234 may include a main battery that is user-replaceable and a secondary battery which is permanently attached to portable device 200 and is not user-replaceable. Other configurations of batteries can be provided, without limitation, in alternate embodiments.

PMU 118 continually monitors power parameters 236 of portable device 200. Power parameters 236 may include, but are not limited to: a current location, a current temperature, a current state of charge (SoC) of battery 234, a charge capacity of battery 234, a discharge/power consumption rate of battery 234, a charge delivery rate of battery 234, and an estimated charge complete time of battery 234.

Portable device 200 may also store usage data 224. Usage data 224 includes: schedule data 226 associated with a user of portable device 200, location data 228 associated with portable device 200, wireless signal strength data 230 associated with one or more radios of portable device 200, activity data 232 associated with one or more applications (e.g., Applications 114*a-n*) of portable device 200, and battery consumption data 238 associated with battery 234 of portable device 200. In one embodiment, schedule data 226 may be stored locally. In another embodiment, schedule data 226 may be retrieved/accessed by portable device 200 from a server or cloud storage. Location data 228 identifies a current location of portable device 200. In another embodiment, location data 228 may include historical location data that is associated with portable device 200. Signal strength data 230 identifies a current signal strength of one or more wireless radios of portable device 200. In another embodiment, signal strength data 230 may include historical signal strength data that is associated with one or more radios of portable device 200. Battery consumption data 238 may identify, for a current charge cycle of battery 234, a battery usage/consumption for each application (e.g., Applications 114*a-n*) executing on portable device 200. In another embodiment, battery consumption data 238 may also include historical battery consumption data for one or more applications of portable device 200.

Each of charging stations 270*a-n* includes a transceiver 278*a-n* for exchanging identifying data 272*a-n* with portable device 200 via a wired and/or wireless connection. Identifying data 272*a* of a particular charging station 270*a* includes location data. Charging stations 270*a-n* may include wired charging stations and/or wireless (inductive) charging stations. In one embodiment, identifying data 272*a-n* may also identify one or more replacement batteries 274*a-n* that are available at or associated with a corresponding charging station 270*a-n*. Identifying data 272*a-n* may also include secondary power parameters 276*a-n* associated with one or more replacement batteries 274*a-n* associated with a corresponding charging station 270*a-n*. Secondary power parameters 276*a-n* of replacement batteries 274*a-n* may include, but are not limited to: a current location, a current temperature, a current state of charge (SoC), a charge capacity, a discharge/power consumption rate, a charge delivery rate, and an estimated charge complete time.

In another embodiment, one or more of replacement batteries 274*a-n* may also include a transceiver 278*a-n* that enables portable device 200 to query and/or receive secondary power parameters 276*a-n* directly from replacement batteries 274*a-n*. For example, replacement battery 274 may include transceiver 278*n* for communicating directly with portable device 200 via a BLE or NFC network. In another embodiment, replacement batteries 274*a-n* may include a transmitter (not illustrated) in lieu of transceiver 278*a-n* which communicates secondary power parameters 276*a-n* to portable device 200. While the illustrated embodiment provides portable device 200 receiving identifying data 272*a-n* and SPP 276*a-n* directly from replacement batteries 274*a-n* and/or charging stations 270*a-n*, in another embodiment, portable device 200 may receive identifying data 272*a-n* and SPP 276*a-n* from an intermediate device (e.g., server 154) which receives and/or maintains identifying data 272*a-n* and SPP 276*a-n* associated with respective charging stations 270*a-n* and/or replacement batteries 274*a-n*.

Once received at portable device 200, identifying data 272*a-n* and SPP 276*a-n* is stored within usage data 224. In one or more embodiments, PMU 118 may limit identifying data 272*a-n* and SPP 276*a-n* that is stored in usage data 224 to only identifying data and SPP that PMU 118 determines are associated with charging stations 270*a-n* and replacement batteries 274*a-n* that are available for use and/or physically compatible with portable device 200. In one embodiment, PMU 118 may discard identifying data 272*a-n* and SPP 276*a-n* that are received at portable device 200 and which PMU 118 determines to be associated with charging stations and/or batteries that are not available and/or that are physically incompatible with portable device. In one embodiment, charging stations 270*a-n* and/or replacement batteries 274*a-n* that are available to portable device 200 include only those charging stations and/or replacement batteries that are linked/associated with an account or service that is also associated with portable device 200 and/or a user of portable device 200. In another embodiment, available charging stations 270*a-n* and/or replacement batteries 274*a-n* are those which are identified by PMU 118 as being located within a particular geographic region and/or a predetermined proximity/radius of a current location of portable device 200. In still another embodiment, available charging stations 270*a-n* may include public charging stations, such as charging stations in airports and/or train stations, that may be used by the user of portable device 200 to charge battery 234.

By analyzing usage data 224, PMU 118 may determine an upcoming period of use of portable device 200. The upcoming period of use represents a time period during which PMU 118 anticipates, based on usage data 224, that access to at least one alternate power source, including charging stations 270a-n and replacement batteries 274a-n, may be limited or otherwise unavailable to portable device 200. In one or more embodiments, in determining the upcoming period of use, PMU 118 may establish, within usage data 224, usage patterns (not illustrated) that are associated with a user of portable device 200 over a period of time. For example, PMU 118 may determine that a user of portable device 200 typically uses public transportation to travel from work to home starting at 5:00 pm every Monday-Friday afternoon. In the provided example, PMU 118 may determine or identify the next relevant period of use to be the user's commute from work to home, which starts at 5:00 pm. This determination may occur, for example, at 4:00 PM each weekday afternoon, based on the established commute schedule, assuming the current location data places the device (and by extension the user) at or around the location of the user's workplace. Additionally, the upcoming period of use can include specific lengths of times, such as 120 minutes, such that the required length of time for powering of the device before access to a next charging station or replacement battery becomes available can be incorporated into the determination being made by PMU 118. PMU 118 may also identify special events within schedule data 226 including, but not limited to, meetings, appointments, holidays, and vacation time. These special events may be given additional weight and/or consideration when determining/identifying the upcoming period of use. For example, PMU 118 may not identify a user's typical commute as the upcoming period of use in response to determining the user is scheduled to be out of the office (e.g., a national holiday) and/or in response to determining the user is not physically present at the office/workplace, based on location data 228.

In determining the upcoming period of use, PMU 118 may also determine a typical usage of portable device 200 during the upcoming period of use and/or a battery consumption 238 that is typically associated with the upcoming period of use. Using the above example, PMU 118 may determine that the user of portable device 200 typically answers calls, reads social media, and reads emails during the user's commute, which results in approximately a 25% consumption of battery 234.

In one embodiment, PMU 118 may also predict, from usage data 224, a future traveling of the user of portable device 200 that corresponds to at least one portion of the upcoming time period of use (e.g., for example time spent traveling on a train) and/or estimate, based on usage data 224 and power parameters 236, an estimated battery consumption of portable device 200 during the upcoming time period of use. The predicted future traveling and/or estimated battery consumption may then be stored to usage data 224.

Based on power parameters 236 and usage data 224, PMU 118 may determine whether battery 234 is capable of powering portable device 200 for the entirety of the determined upcoming period of use. For example, PMU 118 may identify, from usage data 224, the upcoming period of use of portable device 200 as a 2-hour commute from a user's workplace to home that occurs between 5 pm-7 pm. PMU 118 may also identify in real time, from power parameters 236, that battery 234 has 20% SoC remaining. Based on these determinations, PMU 118 may then determine that battery 234 does not have sufficient charge remaining to power portable device 200 for the entirety of the upcoming time period of use.

In response to determining battery 234 is not capable of powering portable device 200 for the entirety of the upcoming period of use, PMU 118 selects at least one alternate power source, from among charging stations 270a-n and replacement batteries 274a-n, that may be used to provide additional power to portable device 200 for use during the upcoming time period of use. For example, PMU 118 may identify replacement battery 274b at charging station 270c in the user's office which currently has an 80% charge. In another example, PMU 118 may identify charging station 270b, which is located in a vehicle associated with the user of portable device 200 and which may be used to charge battery 234 when the current location of portable device 200 reaches the vehicle (e.g., 90 minutes into the commute home, where the commute includes a 30-minute drive from the train/bus stop). In still another example, PMU 118 may identify a public charging station at a train station that may be used to charge portable device 200 while the user is waiting for a train to arrive.

In response to selecting the at least one alternate power (or powering) source, PMU 118 calculates connection time 240 based on at least one of power parameters 236 and usage data 224. Connection time 240 identifies a best and/or optimal time when the identified at least one alternate power source should be coupled to portable device 200 to maximize an available power available to portable device 200 during the upcoming time period of use. Connection time 240 is further calculated such that battery 234 will not expire before the current time reaches connection time 240. For example, PMU 118 may analyze usage data 224 and determine that: (1) battery 234 should last until 6:00 pm, (2) a user of portable device 200 is scheduled to leave the office at 5:00 pm, and (3) replacement battery 274b, which is currently charging and has an 80% charge, is located at the office where portable device 200 is currently located. In response to these determinations, PMU 118 may calculate connection time 240 to be 4:59 pm. By calculating connection time 240 at 4:59 pm, replacement battery 274b is allowed as much time as possible to charge before the user of portable device 200 couples replacement battery 274 to portable device 200 and leaves the office. In another example, in response to determining the user of portable device 200 normally leaves work at 5:00 pm but has a scheduled 4:00-5:00 pm meeting in a distant conference room on the current day, PMU 118 may calculate, connection time 240 as 3:50 pm. Thus, a user of portable device 200 will connect replacement battery 274 to portable device 200 prior to traveling to the conference room for the 4:00 pm meeting and will not have to return to their office to connect replacement battery 274 to portable device 200 before leaving work for home.

In response to calculating connection time 240, PMU 118 generates a power management strategy 222 that identifies the selected at least one alternate power source and connection time 240. Power management strategy 222 provides a set of instructions to be used when managing the powering of portable device 200. The set of instructions ensures that portable device 200 has sufficient power to function for the entirety of the upcoming time period of use. Power management strategy 222 may also include an indication of at least one portion of SPP 276a-n for each replacement battery 274a-n that is identified within power management strategy 222 and/or at least one portion of identifying data 272a-n for each charging station 270a-n that is identified within power management strategy 222. For example, in addition to identifying replacement battery 274b as an alternate power source that should be connected to portable device 200 at 4:59 pm, power management strategy 222 may also identify a current SoC (e.g., 80% charged) and current location (e.g., office) of replacement battery 274b. In another example, power management strategy 222 may identify charging station 270b as being located in the user's car and provide instructions to connect charging station 270b to portable device 200 at 7:00 pm. In one or more embodiments, when battery 234 is a swappable/user-removable battery, power management strategy 222 may also identify a replacement action for a battery 234, at connection time 240 or a time thereafter. For example, in addition to identifying replacement battery 274b as an alternate power source that should be connected at 4:59 pm, power management strategy 222 may also specify that battery 234 should be connected to charging station-3 270c at 4:59 pm (the same time as when replacement battery 274b should be coupled to portable device 200). Thus, partially and/or completely drained batteries may be charged for future usage.

In one or more embodiments, PMU 118 may also generate a dashboard user interface from power management strategy 222 that a user may view and/or interact with via an output device of portable device 200. For example, PMU 118 may generate a dashboard visual representation of power management strategy 222 that is viewable on a display (e.g., display 145) of portable device 200. An example dashboard/user interface of power management strategy 222 is provided in greater detail below in FIG. 4. Additionally, in one or more embodiments, PMU 118 may generate at least one visual, audible, and/or tactile/vibrational alerts to notify a user of portable device 200 of the generation of power management strategy 222 or that connection time 240 for the at least one alternate power source is approaching and/or has been reached.

In one or more embodiments, PMU 118 may continue to monitor power parameters 236, identifying data 272a-n, and SPP 276a-n after power management strategy 222 has been generated in order to perform real-time updates or periodic updates to power management strategy 222. For example, power management strategy 222 may be updated in real-time by PMU 118 to ensure the current SoC of replacement battery 274b, which is identified within power management strategy 222, is always up to date. A connection time 240 identified in power management strategy 222 may also be updated to reflect detected changes in proximity between portable device 200 and a selected charging station. In one or more embodiments, connection time 240 identified within power management strategy 222 may be updated by PMU 118 in response to identifying multiple occurrences where portable device 200 has been connected to a selected alternate power source before or after connection time 240. For example, in response to identifying multiple occurrences where the current location of portable device 200 has reached charging station 270b prior to the 7:00 pm connection time 240, PMU 118 may dynamically update/modify power management strategy 222 to change connection time 240 associated with charging station 270b to the current time and/or a time corresponding to the identified multiple occurrences.

In one embodiment, in response to determining battery 234 is capable of powering portable device 200 for the entirety of the upcoming period of use, PMU 118 may issue/display a notification that informs the user of portable device 200 that the battery life of battery 234 is capable of powering portable device 200 for the upcoming period of use. In another embodiment, the notification may also identify charging stations 270a-n and/or replacement batteries 274a-n that are available to portable device 200 during the upcoming period of use (and/or a period of use following the upcoming time period of use) so that the user may make an informed decision if the user would like to connect portable device 200 to a charging station 270a-n and/or attach at least one replacement battery 274a-n as a precautionary measure against battery 234 depleting.

In one or more embodiments, PMU 118 may also issue one or more reminder alerts 242a-n based on power management strategy 222, a current location of portable device 200, and/or the current time. For example, in response to determining the current location of portable device 200 has reached the location and/or is within a predetermined vicinity of charging station 270b, identified in power management strategy 222, PMU 118 may issue a reminder alert to portable device 200, which alert indicates that portable device 200 should be connected to charging station 270b at the current time. In another example, in response to determining the current time has reached and/or is approaching connection time 240, PMU 118 may issue a reminder alert to portable device 200 that alerts the user of portable device 200 that the at least one alternate power source should be connected to portable device 200 at the current time. PMU 118 may also issue one or more additional reminder alerts to portable device 200 in response to detecting that a predetermined amount of time (e.g., 10 minutes) has expired since the connection time 240 was reached and the at least one alternate power source has not yet been connected to portable device 200.

Figure 3:
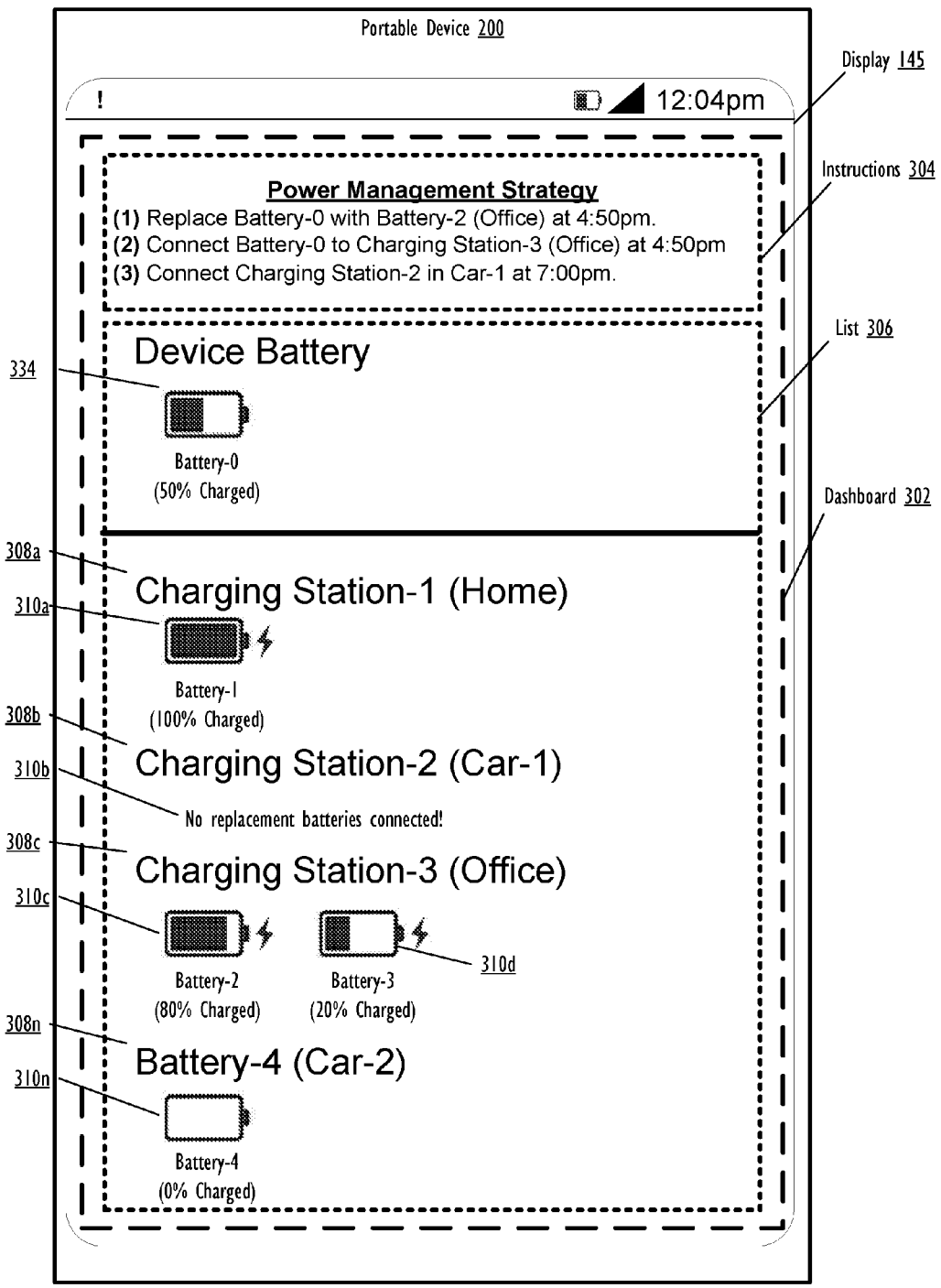
FIG. 3 illustrates an example user interface of a dashboard that is associated with a power management strategy and viewable on a portable device, in accordance with one or more embodiments.

Referring now to FIG. 3, there is depicted an example dashboard user interface that is associated with a power management strategy and viewable on a portable device, in accordance with one or more embodiments of the present disclosure. As depicted, FIG. 3 illustrates portable device 200 having display 145 with a viewable dashboard 302. Dashboard 302 is a visual user interface/representation of power management strategy 222. Dashboard 302 includes instructions 304 and list 306.

Instructions 304 provide a written description of each selected alternate power source identified in power management strategy 222 and the connection time (connection time 240) when each selected alternate power source should be coupled to portable device 200. In one or more embodiments, the identification of when each selected alternate power source should be coupled to portable device 200 may be ordered in an optimal manner to maximize an available power available to portable device 200 during the upcoming time period of use. Within the exemplary embodiment depicted in FIG. 3, instructions 304 identify: (1) that battery-2 located in the office should be coupled to portable device at 4:50 pm, replacing battery-0, (2) that battery-0 (which is currently connected to portable device 200) should be connected to charging station-3 in the Office at 4:50 pm, and (3) that portable device 200 should be connected to charging station-2 in the car at 7:00 pm.

List 306 identifies charging stations and/or replacement batteries that are available and/or physically compatible with portable device 200 and which are identified in power management strategy 222. List 306 includes a first section which contains a device battery indicator 334 associated with battery 234. In an alternate embodiment where battery 234 includes multiple batteries, each battery may be identified by a separate device battery indicator 334 in the first section. List 306 also includes a second section that contains power device categories 308*a-n*, each of which identifies a location of a specific charging station and/or replacement battery. Each power device category 308*a-n* also includes at least one power status notice 310*a-n*. In one embodiment, list 306 may collectively group replacement batteries and charging stations that are currently connected and/or proximately located within a same power device category 308*a-n*, as illustrated by power status notices 310*c-d*. Each power status notice 310*a-n* identifies a secondary power management parameter or identifying information associated with a corresponding replacement battery or charging station. In another embodiment, power status notices 310*a-n* may also identify when a particular charging station does not have any attached replacement batteries and/or when a particular charging station or replacement battery cannot be detected. In the exemplary embodiment provided by FIG. 3, power status notices 310*a*, 310*c*, 310*d*, and 310*n* identify a SoC associated with respective replacement batteries 274*a*, 274*b*, 274*c*, and 274*n* and power status notice 310*b* indicates that no batteries are currently connected to charging station-2 270*b*. It should also be noted that in one or more embodiments, power device categories 308*a-n* and power status notices 310*a* may be continually updated as new/updated identifying data 272*a-n* and SPP 276*a-n* is received and power management strategy 222 is updated. In response to determining that new/updated identifying data 272*a-n* and/or SPP 276*a-n* has not been received for a particular alternate power source (for example, due to a replacement battery being completely depleted), power status notices 310*a* may include a secondary power management parameter associated with a last received identifying data 272*a-n* and/or SPP 276*a-n* and/or may include a notification that indicates communications with particular alternate power source has been lost.

Figure 4:
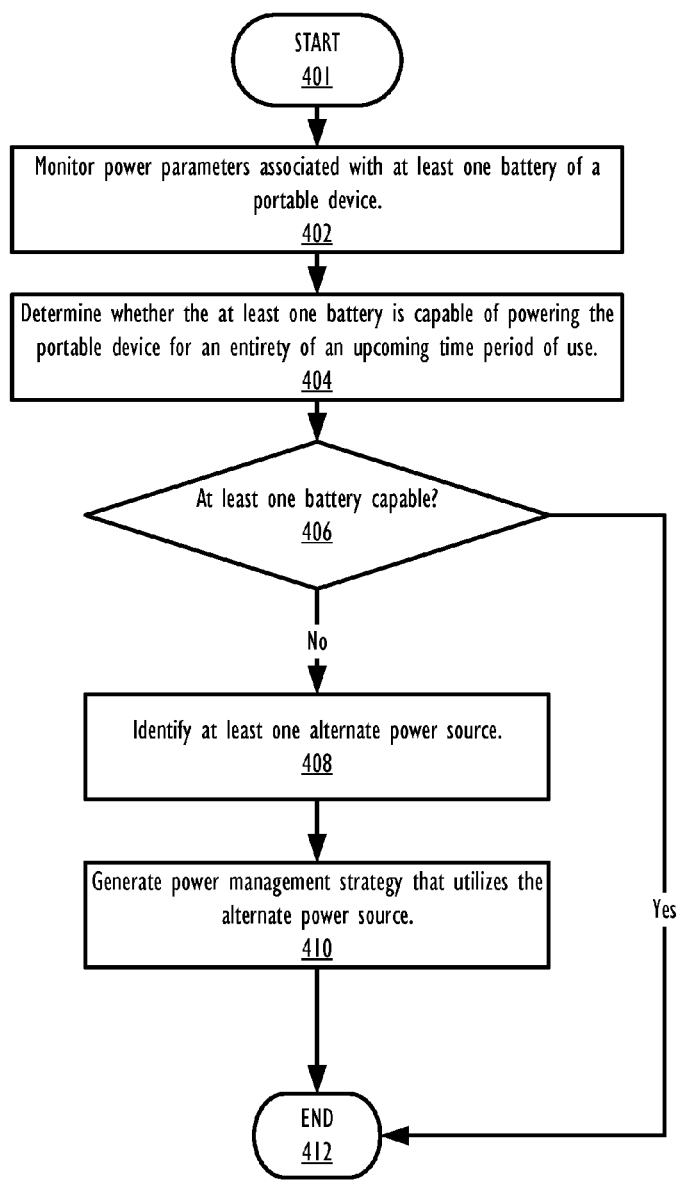
FIG. 4 is a flow chart illustrating a method for generating a power management strategy, in accordance with one or more embodiments.

Referring now to FIG. 4, there is depicted a high-level flow-chart illustrating a method for generating a power management strategy, in accordance with one or more embodiments of the present disclosure. Aspects of the method are described with reference to the components of FIGS. 1-3. Several of the processes of method 400 provided in FIG. 4 can be implemented by a processor (e.g., CPU 104 or CPU 204) executing software code of PMU 118 within a portable device (e.g., FIG. 1, FIG. 2, and/or FIG. 3), server (e.g., server 154), or generic data processing system. The method processes described in FIG. 4 are generally described as being performed by portable device 200.

Method 400 commences at initiator block 401 then proceeds to block 402. At block 402, PMU 118, executing on a processor of portable device 200, monitors power parameters associated with at least one battery (battery 234) of portable device 200. At block 404, a determination is made whether at least one battery of portable device 200 is capable of powering portable device 200 for the entirety of an upcoming time period of use. In response to determining the at least one battery is capable of powering portable device 200 for the entirety of the upcoming time period of use (block 406), method 400 terminates at block 412.

In response to determining at least one battery of portable device 200 is not capable of powering portable device 200 for the entirety of the upcoming time period of use (block 406), method 400 continues to block 408 and PMU 118 identifies least one alternate power source. In response to identifying the at least one alternate power source, method 400 proceeds to block 410 and PMU 118 generates a power management strategy that utilizes the alternate power source. Method 400 then terminates at end block 412.

Figure 5:
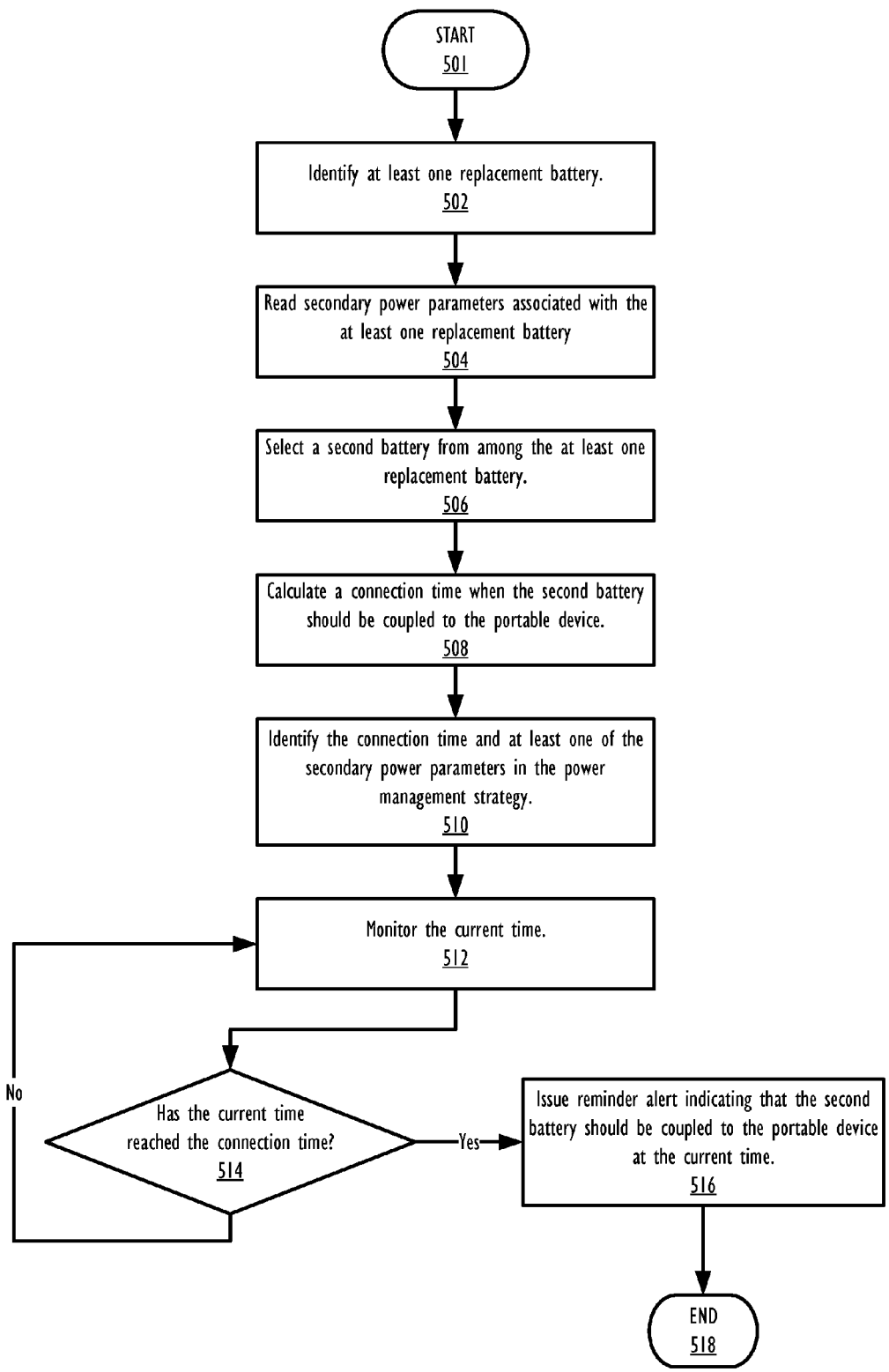
FIG. 5 is a flow chart illustrating a method for selecting a second battery to be coupled to the portable device, in accordance with one or more embodiments.

Referring now to FIG. 5, there is depicted a high-level flow-chart illustrating a method for selecting an alternate power source, which includes a second battery, for providing power to a portable device during an upcoming time period of use, in accordance with one or more embodiments of the present disclosure. Aspects of the method are described with reference to the components of FIGS. 1-3. Several of the processes of method 500 provided in FIG. 5 can be implemented by a processor (e.g., CPU 104 or CPU 204) executing software code of respective PMU 118 within a portable device (e.g., FIG. 1, FIG. 2, and/or FIG. 3), server (e.g., server 154), or generic data processing system. The method processes described in FIG. 5 are generally described as being performed by portable device 200 and/or processor PMU 118. In one or more embodiments, aspects of the method described in FIG. 5 may be included within blocks 408-410 of FIG. 4.

Method 500 commences at initiator block 501, then proceeds to block 502. At block 502, portable device 200, executing PMU 118, identifies at least one replacement battery (replacement battery 274*a-n*) from among at least one alternate power source (e.g., replacement battery 274*a-n* and charging stations 270*a-n*) which is compatible with and may be used to provide power to portable device 200 during the upcoming time period of use. At block 504, secondary power parameters 276*a-n* associated with each of the at least one replacement battery 274*a-n* are read. In response to reading secondary power parameters 276*a-n*, a second battery (e.g., replacement battery 274*a*) from among the at least one replacement battery 274*a-n* is selected (block 506). Method 500 then continues to block 508 and a connection time (connection time 240) when the second battery should be connected to portable device 200 is determined based on usage data 224 and power parameters 236. At block 510, connection time 240 and at least one of the secondary power parameters 276*a* are identified within power management strategy 222.

At block 512, the current time is monitored. In response to determining the current time has reached connection time 240 (block 514), a reminder alert, which indicates that the second battery should be coupled to portable device 200 at the current time, is issued to and/or presented on portable device 200 (block 516). Method 500 then terminates at block 518.

Figure 6:
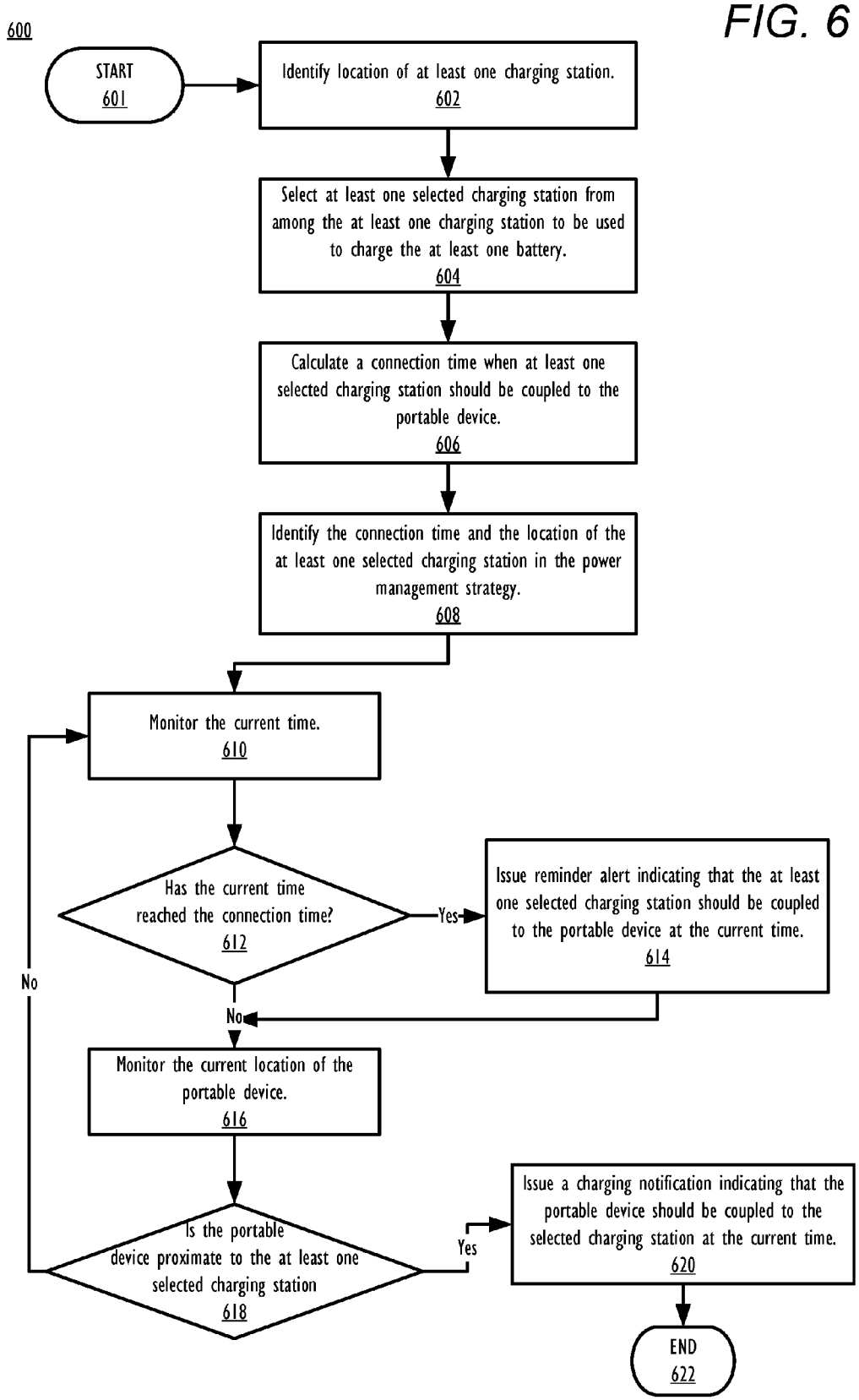
FIG. 6 is a flow chart illustrating a method for identifying at least one alternate charging station to be used to charge a battery of the portable device, in accordance with one or more embodiments.

Referring now to FIG. 6, there is depicted a high-level flow-chart illustrating a method for identifying at least one alternate charging station to be used to charge a battery of the portable device, in accordance with one or more embodiments of the present disclosure. Aspects of the method are described with reference to the components of FIGS. 1-3. Several of the processes of method 600 provided in FIG. 6 can be implemented by a processor (e.g., CPU 104 or CPU 204) executing software code of respective PMU 118 within a portable device (e.g., FIG. 1, FIG. 2, and/or FIG. 3), server (e.g., server 154), or generic data processing system. The method processes described in FIG. 6 are generally described as being performed by portable device 200.

Method 600 commences at initiator block 601, then proceeds to block 602. At block 602, portable device 200, executing PMU 118, identifies at least one charging station (charging station 270*a-n*) from among at least one alternate power source (e.g., replacement battery 274*a-n* and charging stations 270*a-n*) which is compatible with and may be used to provide power to portable device 200 during an upcoming time period of use. At block 604, at least one selected charging station (e.g., charging station 270*a* and 270*b*) is selected from among charging stations 270*a-n*. At block

606, connection time 240 is calculated based on power parameters 236, usage data 224, and identifying data 272*a-n* and/or location data (which is included within identifying data 272*a-n*) associated with each selected charging station (which may be identified within SPP 276*a-n*, in one or more embodiments). Connection time 240 identifies when the at least one selected charging station should be connected to portable device 200 to maximize an available battery charge during the upcoming time period of use. In response to calculating connection time 240, connection time 240 and the current location of the at least one selected charging station are identified within power management strategy 222 (block 608).

At block 610, the current time is monitored. In response to determining the current time has reached connection time 240 (decision block 612), a reminder alert, which indicates that the at least one charging station should be coupled to portable device 200 at the current time, is issued to and/or presented on portable device 200 (block 614) and method 600 proceeds to block 616. In response to determining, at block 612, that the current time has not yet reached connection time 240, the method proceeds directly to block 616.

At block 616 the current location of portable device 200 is continually monitored. In response to determining the current location of portable device 200 is not proximate to the at least one selected charging station (decision block 618), method 600 loops back to block 610. In response to determining the current location of portable device 200 is proximate to the at least one selected charging station (block 618), a reminder alert, which identifies the selected charging station and a location thereof, and which indicates that portable device 200 should be coupled to the at least one selected charging station, is issued to and/or presented on portable device 200 (block 620). Method 600 then terminates at block 622.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
monitoring power parameters associated with at least one battery of a portable device;
reading usage data associated with the portable device;
identifying, from the usage data, the state of charge of the at least one battery;
predicting, from the usage data, future traveling of the user of the portable device, wherein the predicted future traveling corresponds to at least one portion of the upcoming time period of use, and wherein the portable device has limited access to charging stations and replacement batteries during at least that one portion of the upcoming time period of use;
calculating, based on the usage data and the power parameters, an estimated battery consumption of the portable device during the upcoming time period of use;
determining, based on the power parameters, whether the at least one battery of the portable device is capable of powering the portable device for an entirety of an upcoming time period of use; and
in response to determining the at least one battery is not capable of powering the portable device for the entirety of the upcoming time period of use:
identifying at least one alternate power source that may deliver power to the portable device for use during the upcoming time period of use, the at least one alternate power source including at least one of:
at least one replacement battery; and
at least one charging station that is communicatively connected to the portable device; and
generating a power management strategy that includes consideration of the at least one alternate power source;
wherein the estimated battery consumption and predicted future traveling of the user affect the determination of whether the state of charge of the at least one battery is sufficient to continue to power the portable device for the time period and affect the generation of the power management strategy.

2. The method of claim 1,
wherein the power parameters include at least one of: a current location, a current state of charge, a charge capacity, a charge delivery rate, a current temperature, and an estimated charge complete time.

3. The method of claim 2, wherein the at least one alternate power source includes at least one replacement battery, the method further comprising:
reading secondary power parameters associated with the at least one replacement battery;
selecting, based on the power parameters and the secondary power parameters, a second battery from among the at least one replacement battery to power the portable device during the upcoming time period of use;
calculating, based on the usage data, a connection time when the second battery should be coupled to the portable device to maximize an available battery charge during the upcoming time period of use; and
identifying the connection time and at least one of the secondary power parameters within the power management strategy.

4. The method of claim 3, further comprising:
in response to generating the power management strategy:
monitoring a current time associated with the portable device; and
in response to the current time reaching the connection time, issuing a reminder alert indicating that the second battery should be coupled to the portable device at the current time.

5. The method of claim 2, wherein the at least one alternate power source includes at least one charging station, the method further comprising:
identifying a location of at least one charging station;
selecting, based on the usage data and the location of the at least one charging station, at least one selected charging station from among the at least one charging station to be used to charge the at least one battery;
calculating a connection time when the at least one selected charging station should be connected to the portable device to maximize an available battery charge during the upcoming time period of use;
identifying the connection time and the location of the at least one selected charging station within the power management strategy; and
in response to generating the power management strategy:
monitoring a current location associated with the portable device; and
in response to determining the portable device is within a predetermined vicinity of a selected charging station, issuing a charging notification indicating that the portable device should be coupled to the selected charging station.

6. The method of claim 2, wherein the usage data includes data from a group comprising: location data, wireless signal strength data, identifying data of charging stations available to the portable device, schedule data associated with a user of the portable device, activity data associated with one or more applications on the portable device, and battery consumption data.

7. The method of claim 1, wherein:
the portable device is communicatively connected to a plurality of alternate power sources via at least one wireless network; and
identifying the at least one alternate power source further comprises:
receiving, from each of the plurality of alternate power sources, identifying data that indicates a location of a corresponding alternate power source;
determining a current location of the portable device; and
selecting, from among the plurality of alternate power sources, the at least one alternate power source based on the location of the at least one alternate power source and the current location of the portable device.

8. A portable device comprising:
a memory;
at least one battery;
a processor that is coupled to the memory and which generates a plurality of processing modules comprising a power management strategy module that configures the processor to perform power strategy measures, wherein:
the power management strategy module:

monitors power parameters associated with the at least one battery of the portable device;
reads usage data associated with the portable device;
identifies, from the usage data, a state of charge of the at least one battery;
predicts, from the usage data, future traveling of the user of the portable device, wherein the predicted future traveling corresponds to at least one portion of the upcoming time period of use, and wherein the portable device has limited access to charging stations and replacement batteries during at least that one portion of the upcoming time period of use; and
calculates, based on the usage data and the power parameters, an estimated battery consumption of the portable device during the upcoming time period of use;
determines, based on the power parameters, whether the at least one battery is capable of powering the portable device for an entirety of an upcoming time period of use; and
in response to determining the at least one battery is not capable of powering the portable device for the entirety of the upcoming time period of use:
identifies at least one alternate power source that may deliver power to the portable device for use during the upcoming time period of use, the at least one alternate power source including at least one of:
at least one replacement battery; and
at least one charging station that is communicatively connected to the portable device; and
generates a power management strategy that includes consideration of the at least one alternate power source; and
wherein the estimated battery consumption and predicted future traveling of the user affect the determination of whether the state of charge of the at least one battery is sufficient to continue to power the portable device for the time period and affect the generation of the power management strategy.

9. The portable device of claim 8,
wherein the power parameters include at least one of: a current location, a current state of charge, a charge capacity, a charge delivery rate, a current temperature, and an estimated charge complete time.

10. The portable device of claim 9, wherein the at least one alternate power source includes at least one replacement battery, and wherein the power management strategy module:
reads secondary power parameters associated with the at least one replacement battery;
selects, based on the power parameters and the secondary power parameters, a second battery from among the at least one replacement battery to power the portable device during the upcoming time period of use;
calculates, based on the usage data, a connection time when the second battery should be coupled to the portable device to maximize an available battery charge during the upcoming time period of use; and
identifies the connection time and at least one of the secondary power parameters within the power management strategy.

11. The portable device of claim 10, wherein the power management strategy module:
in response to generating the power management strategy:
monitors a current time associated with the portable device; and
in response to the current time reaching the connection time, issues a reminder alert indicating that the second battery should be coupled to the portable device at the current time.

12. The portable device of claim 9, wherein the at least one alternate power source includes at least one charging station, and wherein the power management strategy module:
identifies a location of at least one charging station;
selects, based on the usage data and the location of the at least one charging station, at least one selected charging station from among the at least one charging station to be used to charge the at least one battery;
calculates a connection time when the at least one selected charging station should be connected to the portable device to maximize an available battery charge during the upcoming time period of use;
identifies the connection time and the location of the at least one selected charging station within the power management strategy; and
in response to generating the power management strategy:
monitors a current location associated with the portable device; and
in response to determining the portable device is within a predetermined vicinity of a selected charging station, issues a charging notification indicating that the portable device should be coupled to the selected charging station.

13. The portable device of claim 9, wherein the usage data includes data from a group comprising: location data, wireless signal strength data, identifying data of charging stations available to the portable device, schedule data associated with a user of the portable device, activity data associated with one or more applications on the portable device, and battery consumption data.

14. The portable device of claim 8, further comprising:
at least one wireless transmitter that is communicatively connected to a plurality of alternate power sources via at least one wireless network and that receives, from each of the plurality of alternate power sources, identifying data that indicates a location of a corresponding alternate power source; and
wherein identifying the at least one alternate power source, the power management strategy module:
determines a current location of the portable device; and
selects, from among the plurality of alternate power sources, the at least one alternate power source based on the location of the at least one alternate power source and the current location of the portable device.

15. A computer program product comprising:
a computer readable storage device; and
program code on the computer readable storage device that when executed by a processor associated with a device, the program code enables the device to provide the functionality of:
monitoring power parameters associated with at least one battery of a portable device, the power parameters comprising at least one of: a current location, a current state of charge, a charge capacity, a charge delivery rate, a current temperature, and an estimated charge complete time;
reading usage data associated with the portable device;
identifying, from the usage data, the state of charge of the at least one battery;

predicting, from the usage data, future traveling of the user of the portable device, wherein the predicted future traveling corresponds to at least one portion of the upcoming time period of use, and wherein the portable device has limited access to charging stations and replacement batteries during at least that one portion of the upcoming time period of use;

calculating, based on the usage data and the power parameters, an estimated battery consumption of the portable device during the upcoming time period of use;

determining, based on the power parameters, whether the at least one battery is capable of powering the portable device for an entirety of an upcoming time period of use; and in response to determining the at least one battery is not capable of powering the portable device for the entirety of the upcoming time period of use:
  identifying at least one alternate power source that may deliver power to the portable device for use during the upcoming time period of use, the at least one alternate power source including at least one of:
    at least one replacement battery; and
    at least one charging station that is communicatively connected to the portable device; and
  generating a power management strategy that includes consideration of the at least one alternate power source;

wherein the estimated battery consumption and predicted future traveling of the user affect the determination of whether the state of charge of the at least one battery is sufficient to continue to power the portable device for the time period and affect the generation of the power management strategy.

16. The computer program product of claim 15, wherein the program code further comprises program code that enables the device to provide the functionality of:
  reading secondary power parameters associated with the at least one replacement battery;
  selecting, based on the power parameters and the secondary power parameters, a second battery from among the at least one replacement battery to power the portable device during the upcoming time period of use;
  calculating, based on the usage data, a connection time when the second battery should be coupled to the portable device to maximize an available battery charge during the upcoming time period of use; and
  identifying the connection time and at least one of the secondary power parameters within the power management strategy.

17. The computer program product of claim 15, wherein the program code further comprises program code that enables the device to provide the functionality of:
  identifying a location of at least one charging station;
  selecting, based on the usage data and the location of the at least one charging station, at least one selected charging station from among the at least one charging station to be used to charge the at least one battery;
  calculating a connection time when the at least one selected charging station should be connected to the portable device to maximize an available battery charge during the upcoming time period of use;
  identifying the connection time and the location of the at least one selected charging station within the power management strategy; and
  in response to generating the power management strategy:
    monitoring a current location associated with the portable device; and
    in response to determining the portable device is within a predetermined vicinity of a selected charging station, issuing a charging notification indicating that the portable device should be coupled to the selected charging station.

18. The computer program product of claim 15, wherein:
  the portable device is communicatively connected to a plurality of alternate power sources via at least one wireless network; and
  the program code for identifying the at least one alternate power source further comprises program code that enables the device to provide the functionality of:
    receiving, from each of the plurality of alternate power sources, identifying data that indicates a location of a corresponding alternate power source;
    determining a current location of the portable device; and
    selecting, from among the plurality of alternate power sources, the at least one alternate power source based on the location of the at least one alternate power source and the current location of the portable device.

* * * * *